United States Patent [19]
White

[11] 3,886,717
[45] June 3, 1975

[54] MAN-PROPELLED, SELF-POWERED REAPER
[76] Inventor: Chester A. White, 813 Ram Trl. S.E., Albuquerque, N. Mex. 87123
[22] Filed: July 5, 1973
[21] Appl. No.: 376,608

[52] U.S. Cl. ................................. 56/201; 56/244
[51] Int. Cl. .......................................... A01d 53/06
[58] Field of Search ............ 56/201, 194, 244, 245, 56/233, 231, 324, 257

[56] References Cited
UNITED STATES PATENTS
911,719   2/1909   Hake .................................. 56/201
2,911,781  11/1959  Boehr ................................. 56/235

FOREIGN PATENTS OR APPLICATIONS
322,762   3/1918   Germany ............................. 56/194
246,726   4/1926   Italy .................................... 56/244
114,896  11/1929   Austria ................................ 56/194

Primary Examiner—Louis G. Mancene
Assistant Examiner—J. N. Eskovitz
Attorney, Agent, or Firm—William C. Bowers

[57] ABSTRACT

This invention is a grain cutter bar powered by a small gasoline engine and propelled by two men, one at either end thereof, for use primarily in remote areas where the use of power-driven binders and combines is physically or economically impractical. An alternate provides for the device to be mounted on wheels and controls adjusted so that it can be operated by one man.

8 Claims, 7 Drawing Figures

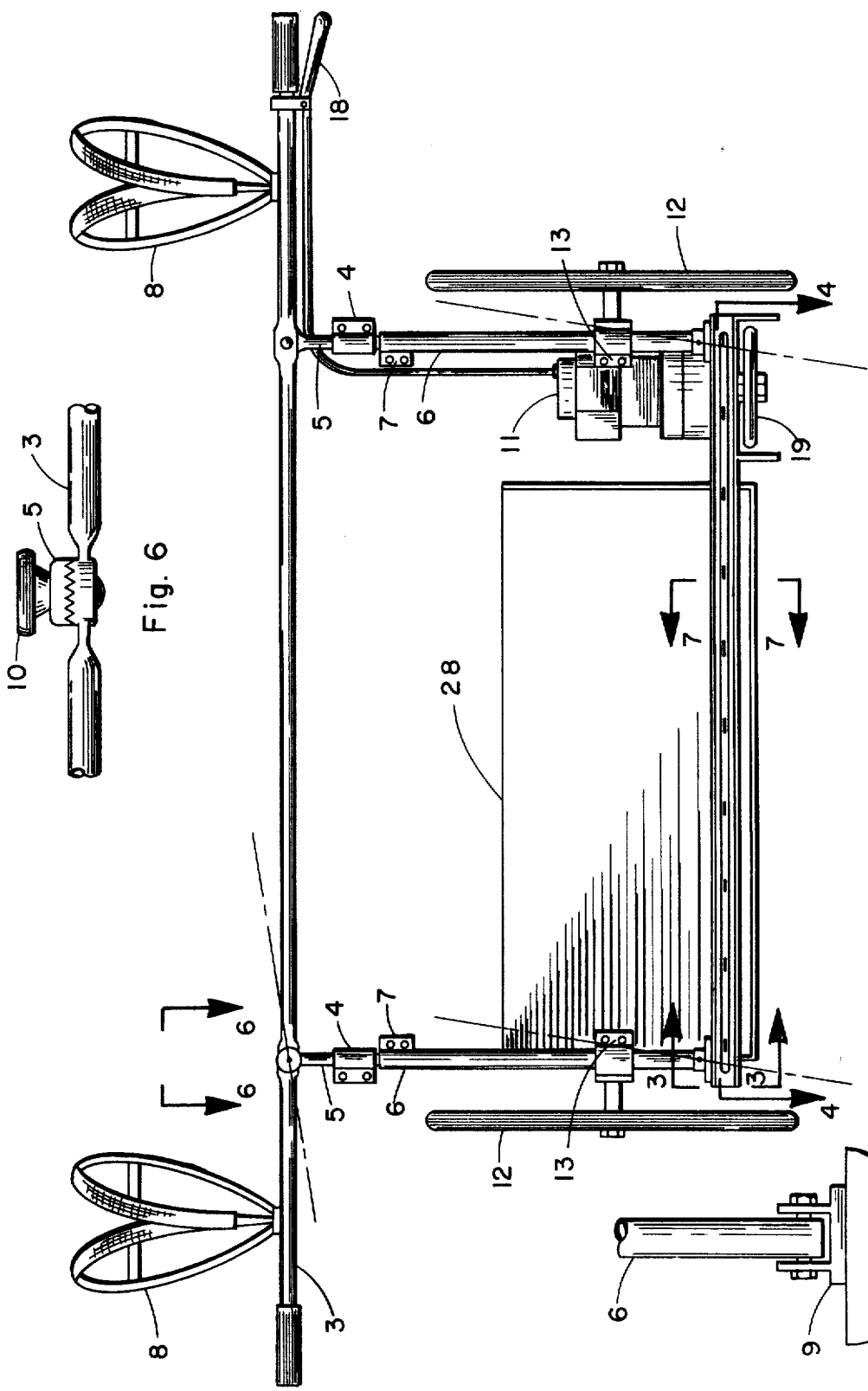

MAN-PROPELLED, SELF-POWERED REAPER

BACKGROUND OF THE INVENTION

Since the McCormick reaper was invented in the 19th Century, the development of harvesting equipment has tended toward larger, more complicated, and heavier, equipment adapted to harvesting grain in large fields. The problems of the small family operation such as exists in the "underdeveloped" countries of the world have been by-passed. This invention reverts to the original problem and provides means for small farmers to harvest their crops with the help of small equipment at low cost, which can be utilized in small areas where large equipment could not possibly operate.

SUMMARY

This invention is a reaper or grain cutter, which is powered by a small gasoline engine, man-carried, and readily maneaverable in constricted areas, permitting harvesting of crops planted in small areas, by a limited number of men. Normally, a man carries each end and the grain is cut as the two men walk through the field.

THE DRAWINGS

FIG. 2 is an elevation of the front thereof, looking at the cutting edge of the cutter bar.

FIG. 3 is a partial elevation on lines 3—3 on FIG. 2.

FIG. 6 is a detail of the locking joint as indicated by lines 6—6 on FIG. 2.

PREFERRED EMBODIMENT OF THE INVENTION

Figure 1:
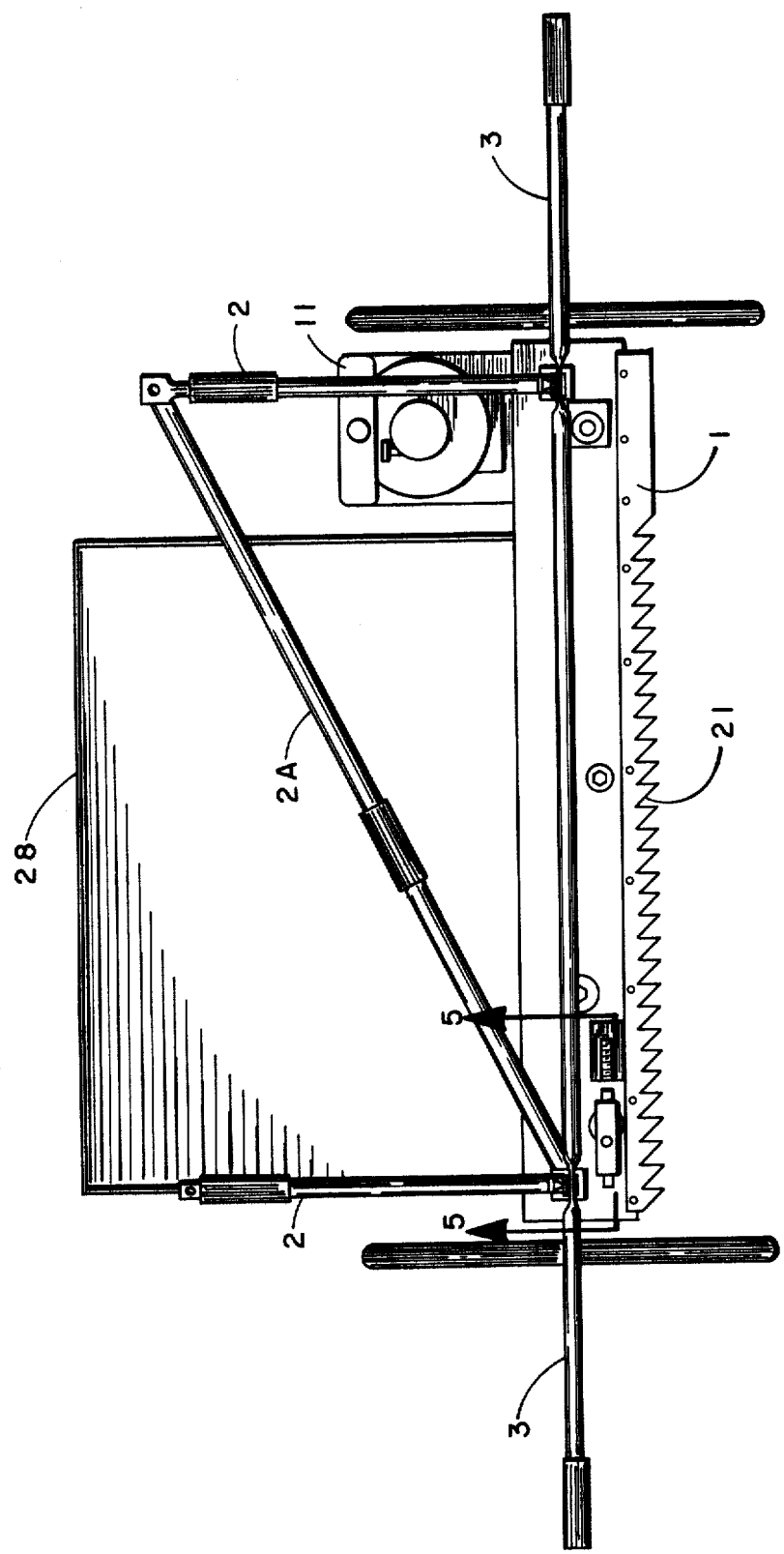
FIG. 1 is a plan view of the entire reaper.

Referring specifically to the drawings, in detail, a grain cutter-bar is designated as 1. To facilitate description since the cutter-bar is relatively thin and flat, any plane within and parallel to the top and bottom surfaces thereof will be referred to generally as a "plane of the cutter-bar." Cutter-bar 1 is supported by a support frame in a plane perpendicular to the plane of the cutter-bar and consisting of two adjustable vertical hangers each of which is made up of lower vertical members 6, clamped by clamps 7 to the upper vertical members 5 to permit adjustment of the frame so that any desired ground clearance may be readily attained; and top horizontal support member 3 connecting the top ends of upper vertical members 5, of the two vertical hangers, and extending outwardly therefrom in the plane of the support frame so that one man at each end may carry the reaper in operation. Shoulder harnesses 8, attached to the outwardly extending ends of the top horizontal support member 3, permit the men to support the reaper from their shoulders rather than with their hands and arms. Rearwardly extending control handles 2, in FIG. 1, are attached to the upper vertical members 5, of the vertical hangers, by clamping ends 4, as shown on FIG. 2. These control handles permit a man at either end to control the position of cutter-bar 1 by rotating the entire reaper about the longitudinal axis of the top horizontal support member 3. The clamp ends 4 clamping the control arms to the upper vertical members 5 of the vertical hangers permit the position of the control arms to be adjusted both vertically and radially about the vertical hangers to place them in the most convenient position for the operators.

To facilitate operation on side slopes, the support frame is adjustable as shown by FIG. 3, where articulating joint connection 9 is shown providing for the adjustment of the angles in the plane of the support frame which lower support members 6, of the vertical hangers, make with the cutter-bar 1, and consequently the angles at the articulating joints which connect the upper vertical members 5, of the vertical hangers, with the top horizontal support member 3, while the plane of the support frame remains perpendicular to the plane of the cutter-bar 1. Whether adjusted for level or side slope cutting, the clamping device 10 shown in FIG. 6 clamps upper vertical member 5 of one of the vertical hangers to top horizontal member 3, at that articulating joint, maintaining the angles formed between the top horizontal support member 3, the vertical hangers, and the cutter-bar 1, as may be desired.

Optional wheels 12, with axle and clamps 13, may be attached by clamping to lower vertical members 6 of the vertical hangers, either to transport the equipment or for use when terrain and other conditions permit. Clamps 13, at the ends of the axles, permit raising and lowering of the axles on vertical members 6, of the vertical hangers, so as to regulate the height of the cutter-bar 1, establishing and maintaining desired ground clearance of cutter-bar 1. When wheels are attached, control handles 2 rotate the reaper about the wheel axles. One of the rearwardly extending control handles 2 may be replaced by a lengthened control handle 2A, turned to form an acute angle with the top horizontal support member 3, and joined to the rearward extremity of the other control handle 2, as shown in FIG. 1, thus forming a triangular control system and permitting operation of the wheeled reaper by one man.

Figure 4:
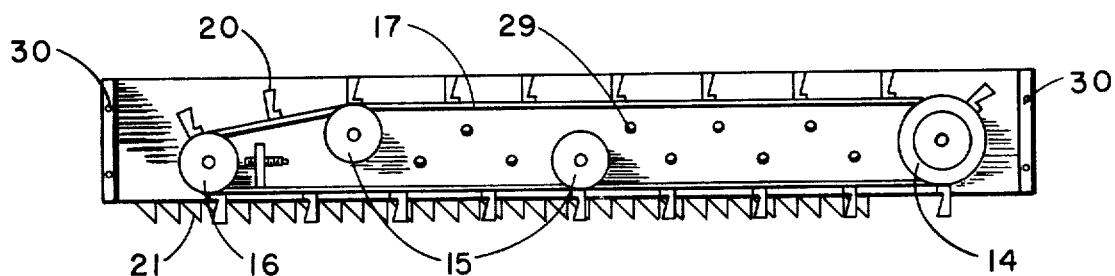
FIG. 4 is a section cut on lines 4—4 on FIG. 2.
Figure 7:
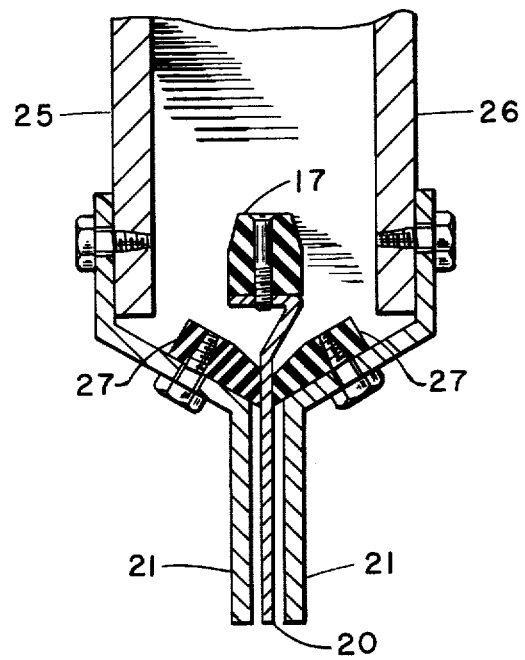
FIG. 7 is a partial section cut on lines 7—7 on FIG. 2.
Figure 5:
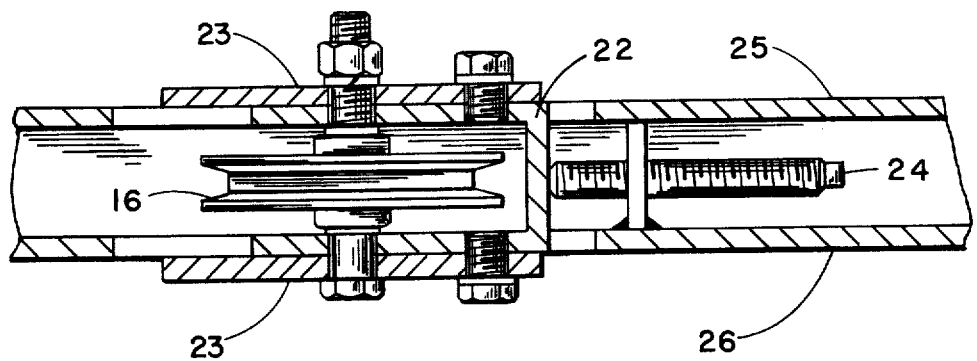
FIG. 5 is a partial section cut on lines 5—5 on FIG. 1.

A gasoline engine and associated centrifugal clutch designated as 11 on FIGS. 1 and 2, are a standard unit as is commonly used on numerous types of small equipment such as lawnmowers, which is mounted integrally with, at one end of, and on the rear of cutter-bar 1, as shown. A V-belt from a centrifugal clutch driven pulley on the gasoline engine unit 11 drives pulley 19, FIG. 2. Pulley 19 is keyed to a normally vertical shaft which drives driving pulley 14 as shown on FIG. 4. As shown on FIGS. 4 and 7, driving pulley 14 drives V-belt 17 which is positioned by adjustable idler pulley 16, mounted on another normally vertical shaft at the opposite end of cutter-bar 1. V-belt 17 normally operates in a horizontal plane previously identified as a plane of cutter-bar 1 and has attached to its outside face at intervals around its circumference, traveling teeth 20 which cut grain by shearing the stems against fixed teeth 21 formed on guide and guard members 21 secured to the forward edges of top and bottom plates 25 and 26 of cutter-bar 1. Traveling teeth 20 are kept aligned, and friction is reduced, by nylon type anti-friction plastic guide strips 27 attached to the inside of guide and guard members 21 adjacent to the forward edges thereof. All of the above operating elements are mounted on or between the top plate 25 and the bottom plate 26 of cutter-bar 1. Adjustable idler pulley 16 is mounted on yoke 22, with adjustable guide plates 23 on the top and bottom of top and bottom plates 25 and 26 of cutter-bar 1, as shown on FIG. 5, and idler pulley adjusting screw 24 adjusts the tension in V-belt 17. End spacers 30 and intermediate spacers 29 maintain spacing between top plate 25 and bottom plate 26 of cutter-bar 1 and add strength and rigidity to the assembly. Intermediate idler pulleys 15 prevent vibration and flapping, and assist in maintaining alignment of V-belt 17. Engine control 18 optionally is mounted on either end of top horizontal support member 3 or on either control handle 2.

An optional grain-catcher 28, similar to grass-catchers commonly used on lawnmowers, when necessary to catch grain as it is cut, is attached to the support frame and positioned to the rear of the cutter-bar 1.

What is claimed is:

1. A man carried reaper for use in relatively small areas to harvest various types of grain, comprising:
   a cutter-bar powered by an integrally mounted gasoline engine;
   said cutter-bar being suspended at its end from vertical hangers of a support frame extending upward in a plane perpendicular to the normally horizontal plane of the cutter-bar;
   the tops of the vertical hangers being attached to a top horizontal support member connecting the two hangers and extending outwardly therefrom so as to be carried by one man at each end of the reaper;
   a rearwardly extending control handle attached near the top of each vertical hanger of the support frame, permitting either of the two men to control the position of the cutter-bar by rotating the cutter-bar about the longitudinal axis of the top horizontal support member; and
   means for controlling the operation of the gasoline engine, said control means being mounted on one end of said top horizontal support member.

2. The reaper of claim 1, in which a shoulder harness is attached to each outwardly extending end of the top horizontal support member of the support frame, so that each man may support his end of the reaper from his shoulders rather than with his hands and arms.

3. The reaper of claim 1, in which the vertical hangers are attached to the cutter-bar and the top horizontal support member of the support frame with articulating joints, in such a manner that the plane of the support frame remains perpendicular to the plane of the cutter-bar, but the angles between members of the support frame and with the cutter-bar may be adjusted so as to more readily cut grain on side slopes; and
   at least one of the articulating joints of the support frame is provided with clamping means to lock the angles to conform with the side slope on which grain is being cut.

4. The reaper of claim 1, in which the lengths of the vertical hangers of the support frame may be adjusted so that any desired ground clearance may be readily attained and the men carrying and operating the reaper may most easily maintain that clearance.

5. The reaper of claim 1, in which the control handles are attached to the vertical hangers of the support frame as by clamping, thus providing means by which the height of the control handles and the angle those handles make with the plane of the support frame may be adjusted for the convenience of the operators.

6. The reaper of claim 1, in which; the cutter-bar is an endless type in which traveling teeth are attached to a V-belt at intervals on the circumference thereof;
   the V-belt normally operates in a horizontal plane, is driven by a driving pulley mounted on a normally vertical shaft at one end of the cutter-bar, which shaft receives its power from the adjacent gasoline engine unit;
   the V-belt is positioned by an adjustable idler pulley at the opposite end of the cutter-bar which also maintains tension in the V-belt;
   additional idler pulleys mounted intermediately between the driving pulley and the adjustable idler pulley prevent flapping and vibration, and assist in maintaining alignment, of the V-belt;
   the V-belt, driving pulley, adjustable idler pulleys, and intermediate idler pulleys are mounted between top and bottom plates of the cutter-bar which are maintained at proper spacing by spacers at the ends and intermediate locations;
   secured to the forward edges of the cutter-bar top and bottom plates are guide and guard members having fixed teeth formed on the forward edges thereof;
   grain is sheared by the traveling teeth of the V-belt passing between the fixed teeth of the two guide and guard members; and
   the traveling teeth are constrained and guided by nylon type anti-friction plastic guide strips secured to the inside of the top and bottom guide and guard members adjacent to the forward edges thereof.

7. The reaper of claim 1, in which wheels are attached as by clamping axles thereof to the vertical hangers of the support frame so the height of the cutter-bar is adjustable to maintain desired ground clearance, and the operators are relieved from supporting the weight of the reaper.

8. The reaper of claim 1, in which a grain-catcher similar to grass-catchers used on lawnmowers is attached to the support frame at the rear of the cutter-bar when it is necessary to catch the grain as it is cut.

* * * * *